INVENTOR.
Abram W. Wheaton,
BY George D. Richards
ATTORNEY.

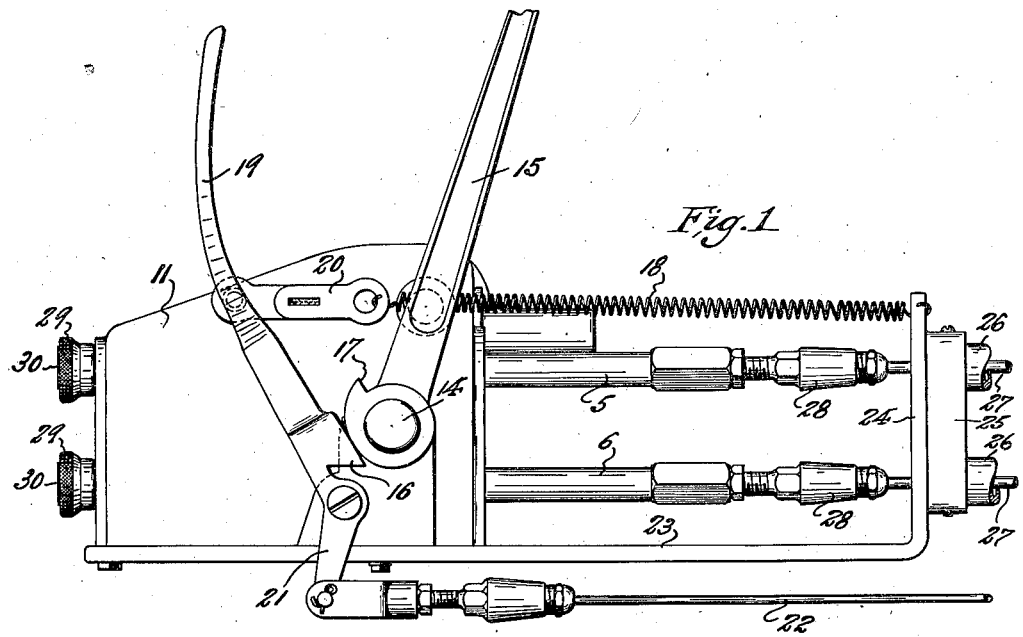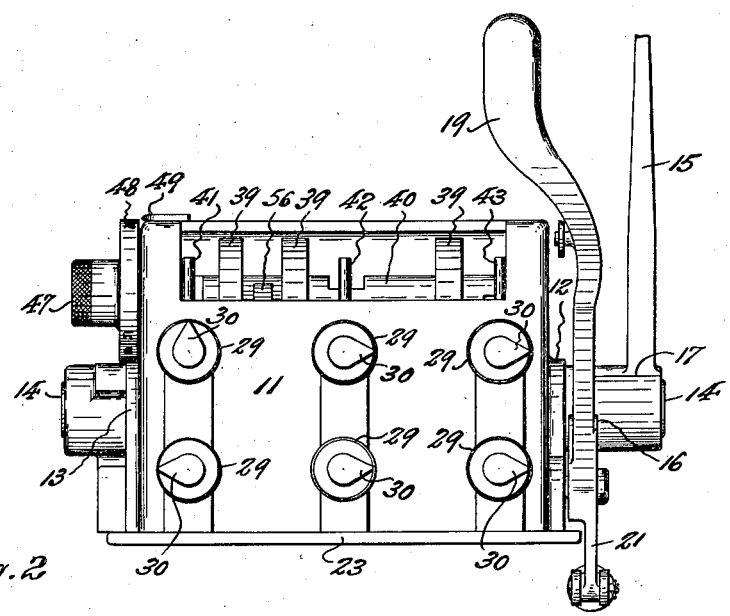

March 14, 1939.   A. W. WHEATON   2,150,667
SELECTIVE REMOTE CONTROL MECHANISM
Filed Dec. 17, 1937   3 Sheets—Sheet 3
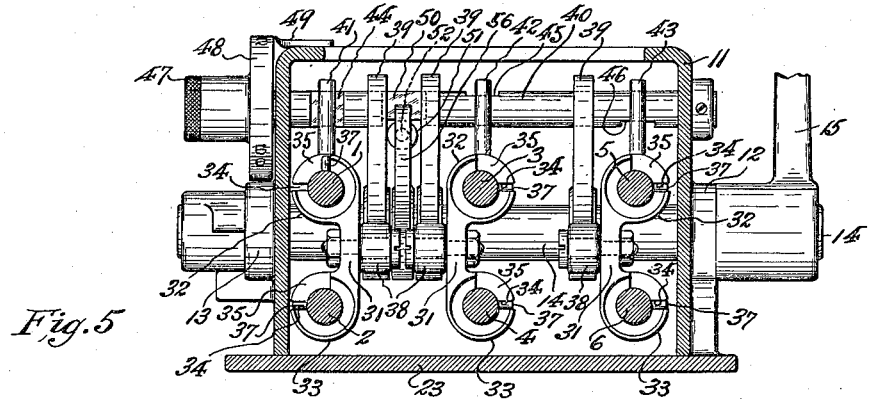
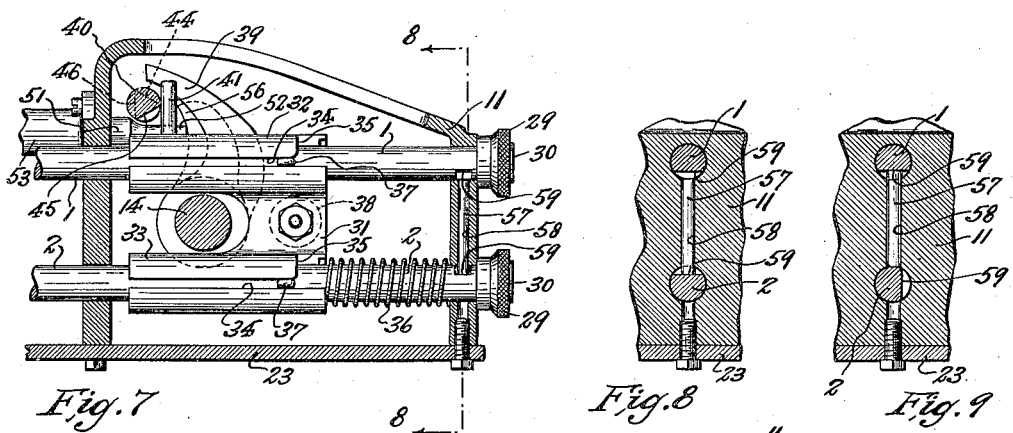
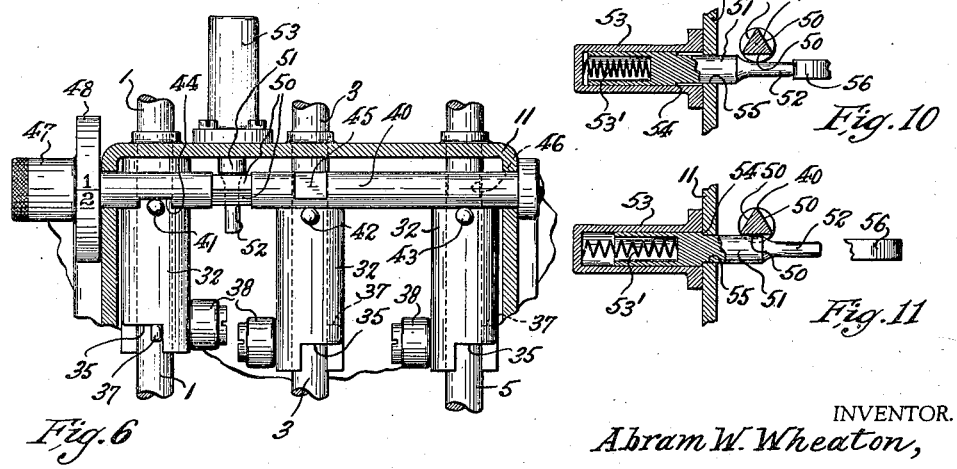
INVENTOR.
Abram W. Wheaton,
BY George D. Richards
ATTORNEY.

Patented Mar. 14, 1939

2,150,667

UNITED STATES PATENT OFFICE 2,150,667

SELECTIVE REMOTE CONTROL MECHANISM

Abram W. Wheaton, Maplewood, N. J., assignor to A. W. Wheaton Brass Works, Newark, N. J., a corporation of New Jersey Application December 17, 1937, Serial No. 180,326

10 Claims. (Cl. 74—483)

This invention relates to improvements in control mechanism for selectively actuating remotely situated devices, such e. g. as valves; and the invention has reference, more particularly, to a novel selective control and actuating means for opening the emergency valves at the bottoms of the respective chambers of a compartment tank truck such as used for transporting various kinds of fluids, and especially fluids such as oil and gasoline.

This invention has for an object to provide improvements in that type of selective remote control mechanism which is disclosed in my copending application for United States Letters Patent, Serial No. 158,376, filed August 10, 1937; said improvements comprising a novel means for locking a plurality of actuator selector rods against manipulation but subject to selective release for operation in such manner that, when a selected rod is manipulated, all the others thereof will remain locked, and consequently only one valve at a time can be actuated through the agency of power applying devices of the remote control mechanism, according to the selective release and manipulation of a corresponding selector rod.

Other objects of this invention, not at this time more particularly enumerated, will be understood from the following detailed description of the same.

Figure 3:
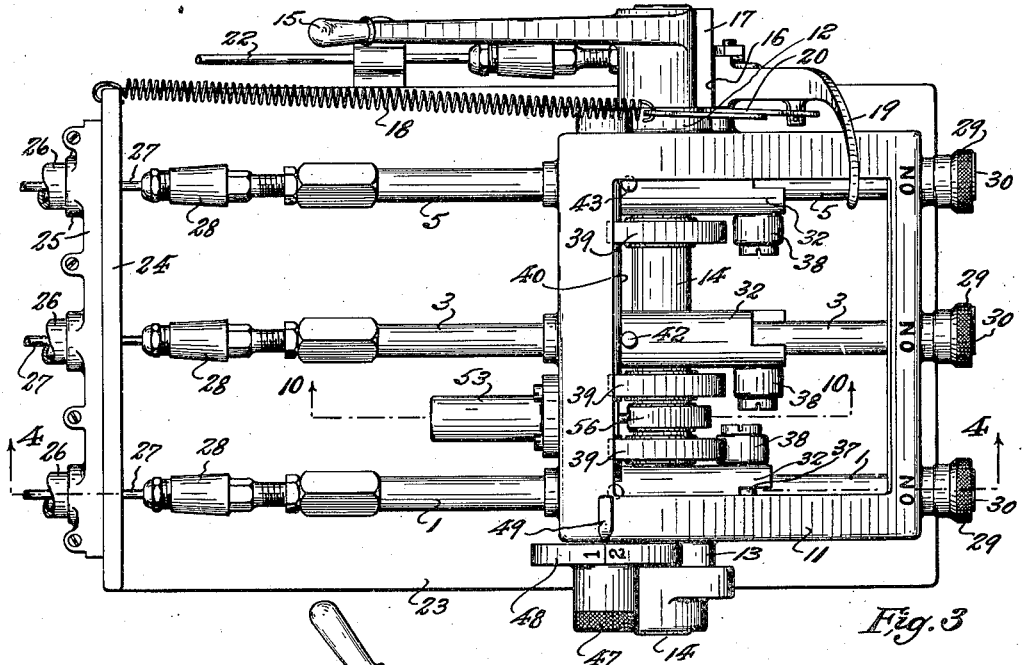
Figure 4:
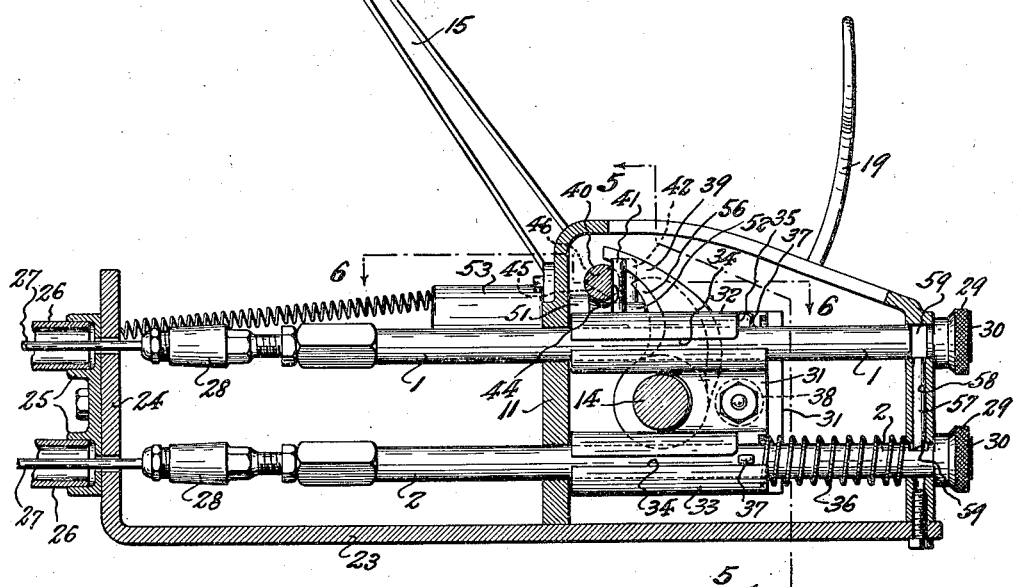

An illustrative embodiment of the selective remote control means made according to this invention is shown in the accompanying drawings, in which:

Fig. 1 is a side elevation of said control mechanism; Fig. 2 is a front end elevational view thereof; Fig. 3 is a top plan view thereof; Fig. 4 is a longitudinal sectional view thereof, taken on line 4—4 in Fig. 3; Fig. 5 is a transverse vertical section therethrough, taken on line 5—5 in Fig. 4; Fig. 6 is a fragmentary horizontal section, taken on line 6—6 in Fig. 4; Fig. 7 is a fragmentary longitudinal section similar to that of Fig. 4, but with the selector rods in normal initial locked position; Fig. 8 is a fragmentary sectional view, taken on line 8—8 in Fig. 7, and Fig. 9 is a similar view showing certain operations consequent upon operative manipulation of one selector rod; Fig. 10 is a fragmentary detail vertical section, taken on line 10—10 in Fig. 3, showing the lock shaft released subject to manipulation; and Fig. 11 is a similar view, showing said lock shaft restrained against manipulation.

Similar characters of reference are employed in the above described views, to indicate corresponding parts.

In the drawings, the reference character 11 indicates a housing to contain the remote control mechanism, the same being suitably mounted at the rear end of a compartment tank truck (not shown), to the emergency valves of which the remote control mechanism is operatively connected.

Journaled in bearings 12 and 13, respectively formed in connection with the side walls of said housing, is a transversely disposed oscillatable shaft 14, upon one exterior end of which is affixed a hand lever 15 for operating the same. Pivotally mounted exteriorly of said housing 11 is a detent means 16 which engages with a latch lug 17 on the hub of said hand lever 15, to thereby hold the hand lever and shaft in the position to which the same are operatively moved. This detent means is yieldably urged into engaging relation to said latch lug 17 by spring means 18, subject to manual release therefrom by means of the tripping handle 19, and to automatic release therefrom, in the event of fire, by the parting of a fuse link 20, which interconnects said spring 18 and tripping handle 19. Said detent means 16 may also be provided with a tripping lever 21, to which is connected a pull means 22 to extend to the front end of the truck, so that manual release of the detent means may be attained from said front end of the truck.

Slidably extending through and between the front and rear walls of the housing are a plurality of longitudinally extending selector rods, the same being capable of both longitudinal sliding movement and rotative movement. These selector rods may vary in number according to the number of remote devices to be controlled and to which they respectively correspond. In the illustrative arrangement thereof, as shown in the accompanying drawings, there are six of these selector rods, respectively indicated by the reference characters 1, 2, 3, 4, 5 and 6. Said selector rods are arranged in groups of two or pairs, the members of which are disposed in a common vertical plane subject to actuation by actuator means common thereto, as will presently appear. As shown, selector rods 1 and 2 constitute one such pair, 3 and 4 a second such pair, and 5 and 6 a third such pair.

Connected with the base 23 of the housing 11, which extends forwardly beyond the front wall of said housing, is an upstanding bracket member 24, having secured thereto a clamp socket fixture means 25 to receive and hold conduits 26 through which extend flexible pull cables 27 leading from the remote control mechanism to the respective valves or other remotely actuated devices which are to be operated by and through the agency of said remote control mechanism. The forwardly extending ends of said selector rods are respectively coupled to the respective cables 27 by means of swivel couplers 28 of suitable construction, whereby the longitudinal pulling movement of the selector rods may be operatively transmitted to said cables while nevertheless said selector rods are free for rotative manipulation.

Affixed to the rearward ends of said selector rods, which project exteriorly outward through the rear wall of said housing 11, are finger pieces or knobs 29, each preferably having on the outer face thereof a position indicating pointer means or arrow head 30.

Cooperatively associated with each said group or pair of selector rods is a longitudinally movable actuator block 31 having upper and lower sleeves 32 and 33 respectively slidably engaged upon the upper and lower members of each said group or pair of selector rods. Extending longitudinally through a side of each sleeve 32—33 is a slot 34, and at its rearward end each said sleeve is cutaway to provide a lateral shoulder 35 intersecting the rearward end portion of the sleeve slot 34. A spring means 36 is operative upon each actuator block 31 and its sleeves 32 and 33 to exercise a yielding forward thrust thereupon. Each selector rod is provided with a radially projecting coupler lug 37 which is receivable in the sleeve slot 34 corresponding to the respective selector rods, and which, under proper conditions, may be turned to operative abutting engagement with the shoulder 35 of said sleeve by rotative manipulation of the selector rod from which it springs.

Mounted on each actuator block 31 intermediate its sleeves is a laterally projecting roller stud 38. Fixed on said shaft 14 are cam members 39 corresponding to and cooperative with the roller studs 38 of the respective actuator blocks.

Rotatably mounted in and extending between the sides of said housing 11 is a transverse lock shaft 40 which extends above and across the upper sleeves of the respective actuator blocks 31. Projecting upwardly across the lock shaft from the upper sleeve of the actuator block 31 serving the selector rods 1 and 2 is a stop pin 41; and in like manner, stop pins 42 and 43 are respectively connected with the actuator blocks which respectively serve the selector rods 3 and 4 and the selector rods 5 and 6. At a point aligned with the position of the stop pin 41, the lock shaft 40 is pivoted with release recess 44 having a flat bottom face in the plane of a chord intersecting the circumference of said lock-shaft. At a point aligned with the position of the stop pin 42, the lock shaft is provided with a similar release recess 45 having a flat bottom face, and, in like manner, at a point aligned with the position of the stop pin 43, the lock shaft is provided with another similar release recess 46 having a flat bottom face. The respective bottom faces of the release recesses 44, 45 and 46 are successively offset relatively one hundred and twenty degrees about the circumference of said lock shaft. Fixed upon an exterior end of said lock shaft 40 is a finger piece 47 by which the same may be rotatively manipulated, and provided in connection with said finger piece is an index wheel 48 having graduations corresponding to the respective positions of said release recesses and their bottom faces, said graduations being registrable with a stationary pointer element 49 provided in connection with the housing 11.

Means are provided for securing the lock shaft 40 against rotative manipulation under certain conditions. This means comprises the provision of a series of circumferentially aligned lock recesses 50 having flat bottom faces corresponding in number and spaced relation to the release recesses 44, 45 and 46. Cooperative with said lock recesses 50 is a bolt member 51 having a reduced stem 52 projecting axially from its free end. This bolt member 51 is slidably mounted in a supporting barrel or casing 53, which is affixed to the forward wall of said housing 11, and is normally projected from said barrel or casing 53, by spring means 53', to a normal stopped position determined by the engagement of an annular shoulder 54 with the margins of an opening 55 in said housing forward wall, through which the bolt is normally projected to extend beneath and transversely of the lock shaft 40 at the point thereof where said lock recesses 50 are located. Affixed on said oscillatable shaft 14 is a bolt retractor cam 56 which cooperates with said bolt stem 52 to release the bolt member 51 from locking relation to said lock shaft 40 when the oscillatable shaft 14 occupies normal initial inactive position.

Means are further provided cooperative with the members of each pair of selector rods 1—2, 3—4, and 5—6, whereby when one of a given pair of said selector rods is rotatively moved to operative coupled relation to an associated actuator block 31, the other of said pair will be automatically locked against rotative manipulation in normal initial inactive position. Each such means comprises a stop bolt 57, vertically slidable in a slideway or passage 58 provided in the rear wall of said housing 11 between the respective members of each pair of selector rods. Each selector rod is provided with a stop bolt receiving recess 59 having a flat bottom face, and being normally opposed to the end of said stop bolt 57 adjacent thereto.

In considering the use and manipulation of the means for locking the selector rods against operation but subject to selective release for operation in such manner that, when a selected rod is released for actuation, all others thereof will remain inoperative, it is to be understood that the selector rods 1 to 6 inclusive are not subject to axial displacement by direct outward pull thereon exercised merely by hand upon their finger pieces or knobs 29, for the reason that the resistance to axial movement offered by the remote devices to be controlled (such e. g. as emergency valves) to which the rods are respectively connected, is too great to be overcome by such direct axial manipulation of the rods, but can only be overcome by the power applying means, such as provided by the hand lever actuated cams 39.

In the use and manipulation of the mechanism, when the lock shaft 40 is rotatively adjusted so that all of the graduation of its index wheel 48 are out of register with the pointer element 49, then the lock shaft will be so positioned as to engage the stop pins 41, 42 and 43 so as to thrust the same rearwardly, thus moving the actuator blocks 31 and their sleeves 32—33 rearwardly against the forward thrusting tension of the spring means 36, and consequently causing the slots 34 to straddle the coupler lugs 37 of the several selector rods (see Fig. 7). Under these circumstances none of the selector rods may be rotatively moved from normal initial inactive position to active coupled relation to an actuator block and corresponding sleeve thereof, until the lock shaft is selectively positioned to release a selected pair of said selector rods, one of which it is desired to adjust to active position.

Assuming that, under the above stated conditions, it is desired to release the selector rods 1 and 2 so that a desired one of the two may be turned to active position. In such case, the lock shaft 40 is rotated by means of the finger piece 47 until the graduation of its index wheel 48 corresponding to the selector rods 1 and 2, and accordingly marked 1—2, is brought to registration with the fixed pointer element 49. By such rotative adjustment, the lock shaft is positioned to bring its release recess 44 in opposition to the stop-pin 41, and consequently the latter will move forward with its actuator block 31 under the thrust of spring means 36 until it abuts the flat bottom face of the release recess. The consequent forward movement permitted to the actuator block 31 served by said stop pin 41 and accompanying corresponding movement of the sleeves 32—33 thereof, so disposed the latter as to withdraw their slots 34 from restraining embrace of the coupler lugs 37 of selector rods 1 and 2 (see Fig. 4), thus freeing both of the latter for selective rotative adjustment. Since the release recesses 44, 45 and 46 are successively disposed at spaced intervals around the lock shaft circumference, it follows that only one of the said release recesses can be operatively opposed to a corresponding stop pin at a time, and consequently all the selector rods except the particular pair released by a selected adjusted position of said lock shaft will remain in the normal locked position already above described.

Selector rods 1 and 2 having been released for selective manipulation as stated, the operator may turn one thereof to operative coupled relation to the actuator block 31 cooperating therewith. Assume that it is desired to couple selector rod 1 to and for movement by the associated actuator block 31, in such case the knob 29 thereof is manipulated to turn selector rod 1 a quarter turn, as indicated by the movement of its pointer means or arrow head 30 from normal horizontal position to upturned vertical position (see Fig. 2). Such rotation of selector rod 1 carries its coupler lug 37 upwardly to a position across and behind the shoulder 35 of sleeve 32, so that any rearward movement imparted to actuator block 31 and its sleeves 32 and 33 will be transmitted to said selector rod 1. In the turning of selector rod 1 to operative coupled relation to the associated actuator block 31, its stop bolt receiving recess 59 is moved out of alignment with the stop bolt 57 (see Fig. 4) thereby opposing the circumferential periphery of this selector rod to the upper end of the stop bolt so that the lower end of the latter is immovably engaged in and against the flat bottom face of the recess 59 of selector rod 2, thus locking said selector rod 2 against rotative manipulation. It will be understood that if selector rod 2 had been moved to operative coupled relation to the actuator block 31, then the turning of the same to such position would have lifted the stop bolt 57 so as to thrust its upper end into and against the flat bottom face of the recess 59 of selector rod 1 so as to obstruct rotative movement of the latter (see Fig. 9).

By the above operations selector rod 1 is operatively related to the actuating mechanism, while selector rod 2 and all the other selector rods remain locked against any manipulation or use while selector rod 1 is in use.

To actuate the remote valve or other device connected to selector rod 1 by a cable 27, the hand lever 15 is swung back thereby rocking shaft 14 and its cams 39, so that the latter engage the roller studs 38 of the actuator blocks 31, thus causing the latter to move rearwardly. Since the slots 34 of all sleeves of the actuator blocks are aligned with and engage the coupler lugs 37 of all but selector rod 1, the rearward movements of said actuator blocks and sleeves will not be transmitted to said any selector rod except selector rod 1, the latter however will be retracted, and by such movement will exert an operative pull upon the cable 27 connected therewith, to in turn actuate the remote valve or other device served by said cable.

It will be obvious that by properly and selectively adjusting the lock-shaft 40 any one of the several pairs of selector rods may be manipulated for active operation while all others remain locked in inactive normal initial positions, all in the manner fully above described, by way of example, with reference to selector rod 1.

When the hand lever 15 is pulled to actuate the mechanism and retract a selected selector rod for operation of the remote device to which it is connected, said hand lever 15 will be operatively engaged by the detent means 16—17 to hold the same and the actuated selector rod in active position as long as desired. Under these circumstances, it is desirable that the lock shaft 40 itself be secured against any disturbance from its adjusted position, and so that none of the locked selector rods could be disturbed or tampered with. This is accomplished by the operation of the bolt member 51. When the shaft 14 occupies its normal initial position, the cam 56 affixed thereon engages the bolt stem 52 to press the same forward, thereby thrusting said bolt member 51 inwardly of its barrel 53 and against the tension of the spring 53', thereby removing the bolt member 51 from beneath the lock-shaft (see Fig. 10). When the shaft 14 is actuated, said cam 56 is carried away from the bolt stem 52, whereby the spring 53' projects the bolt member 51 beneath the lock-shaft 40 and against a bottom face of a lock recess 50 presented toward the same, thus obstructing any rotative manipulation of said lock-shaft 40 and preventing any accidental or intentional movement thereof out of a given position to which it has been previously adjusted (see Fig. 11).

It will be understood that various changes could be made in the construction and arrangement of the various parts and elements of the mechanisms above described without departing from the spirit of this invention or the scope of the appended claims. It is therefore intended that all matter contained in the above description or shown in the accompanying drawings shall be interpreted as illustrative and not in a limiting sense.

I claim:

1. In mechanism of the kind described, a plurality of selector rods connected with remote devices operable by axial movements thereof but as so connected being axially immovable except by power transmitting agencies, power transmitting means for actuating said rods axially, each rod having means for releasably coupling the same in actuatable relation to said actuating means, and means for locking all the remaining rods in normal uncoupled relation to said actuating means when a selected rod is operatively coupled with the latter.

2. In mechanism of the kind described, a plurality of selector rods each supported for both axial and rotative movements, said selector rods being adapted for connection with remote devices operable by axial movements thereof but as so connected being axially immovable except by power transmitting agencies, power transmitting actuating means for axially moving said rods, each rod having a coupling element movable by rotation of the rod from inactive into active relation to said actuating means, said actuating means having portions to engage said coupling elements in their inactive positions to lock said rods against coupling rotation, and means for selectively releasing said rods for coupling rotation.

3. In mechanism of the kind described, a plurality of selector rods each supported for both axial and rotative movements, said selector rods being adapted for connection with remote devices operable by axial movements thereof but as so connected being axially immovable except by power transmitting agencies, a plurality of actuating means slidably engaging said rods, power transmitting means for operating said actuating means to transmit axial movement to said rods, each rod having a coupling element movable from inactive into active relation to an actuating means by rotation of the rod, the actuating means having portions to engage said coupling elements in their inactive positions to lock said rods against coupling rotation, and a manipulatable locking means for moving the actuating means into and out of coupling element holding relation for selectively releasing said rods for coupling rotation.

4. In mechanism of the kind described, a plurality of selector rods each supported for both axial and rotative movements, said selector rods being adapted for connection with remote devices operable by axial movements thereof but as so connected being axially immovable except by power transmitting agencies, a plurality of actuating means slidably engaging said rods, power transmitting means for operating said actuating means to transmit axial movement to said rods, each rod having a coupling element movable from inactive into active relation to an actuating means by rotation of the rod, the actuating means having portions to engage said coupling elements in their inactive positions to lock said rods against coupling rotation, a manipulatable locking means for moving the actuating means into and out of coupling element holding relation for selectively releasing said rods for coupling rotation, and means to secure said locking means against manipulation during operation of said actuating means for transmission of operative axial movement to a coupled selector rod.

5. In mechanism of the kind described, a plurality of selector rods arranged in pairs, each rod being independently supported for both axial and rotative movements, said selector rods being adapted for connection with remote devices operable by axial movements thereof but as so connected being axially immovable except by power transmitting agencies, an actuating means slidably engaging each pair of rods, power transmitting means common to all actuating means for operating the same to transmit axial movement to said rods, each rod having a coupling element movable from inactive into active relation to the associated actuating means by rotation of the rod, each actuating means having slotted portions to ride over corresponding coupling elements when the latter occupy inactive position, a rotatable lock shaft, each actuating means having a stop-pin to abut said lock shaft, means to yieldably thrust each actuating means into stop-pin engaged relation to said lock shaft and disposed to normally engage its slotted portions with corresponding inactively positioned rod coupling elements to lock the rods against coupling relation, and said lock shaft having a plurality of release recesses relatively spaced along and around its periphery and respectively positioned for cooperation with the stop pins of the respective actuating means, whereby rotative adjustment of said lock shaft selectively disposes said release recesses to permit selective movement of said actuating means into and out of coupling element holding relation for releasing a selected pair of rods for coupling rotation while restraining the others against coupling rotation.

6. In mechanism of the kind described, a plurality of selector rods arranged in pairs, each rod being independently supported for both axial and rotative movements, said selector rods being adapted for connection with remote devices operable by axial movements thereof but as so connected being axially immovable except by power transmitting agenies, an actuating means slidably engaging each pair of rods, power transmitting means common to all actuating means for operating the same to transmit axial movement to said rods, each rod having a coupling element movable from inactive into active relation to the associated actuating means by rotation of the rod, each actuating means having slotted portions to ride over corresponding coupling elements when the latter occupy inactive position, a rotatable lock shaft, each actuating means having a stop-pin to abut said lock shaft, means to yieldably thrust each actuating means into stop-pin engaged relation to said lock shaft and disposed to normally engage its slotted portions with corresponding inactively positioned rod coupling elements to lock the rods against coupling rotation, said lock shaft having a plurality of release recesses relatively spaced along and around its periphery and respectively positioned for cooperation with the stop pins of the respective actuating means, whereby rotative adjustment of said lock shaft selectively disposes said release recesses to permit selective movement of said actuating means into and out of coupling element holding relation for releasing a selected pair of rods for coupling rotation while restraining the others against coupling rotation, and means cooperative with each pair of selector rods adapted to lock one thereof against coupling rotation when the other is rotated into operative coupled relation to the associated actuating means.

7. In mechanism of the kind described, a plurality of selector rods arranged in pairs, each rod being independently supported for both axial and rotative movements, said selector rods being adapted for connection with remote devices operable by axial movements thereof but as so connected being axially immovable except by power transmitting agencies, an actuating means slidably engaging each pair of rods, power transmitting means common to all actuating means for operating the same to transmit axial movement to said rods, each rod having a coupling element movable from inactive into active relation to the associated actuating means by rotation of the rod, each actuating means having slotted portions to ride over corresponding coupling elements when the latter occupy inactive position, a rotatable lock shaft, each actuating means having a stop-pin to abut said lock shaft, means to yieldably thrust each actuating means into stop-pin engaged relation to said lock shaft and disposed to normally engage its slotted portions with corresponding inactively positioned rod coupling elements to lock the rods against coupling rotation, said lock shaft having a plurality of release recesses relatively spaced along and around its periphery and respectively positioned for cooperation with the stop pins of the respective actuating means, whereby rotative adjustment of said lock shaft selectively disposes said release recesses to permit selective movement of said actuating means into and out of coupling element holding relation for releasing a selected pair of rods for coupling rotation while restraining the others against coupling rotation, and means cooperative with each pair of selector rods adapted to lock one thereof against coupling rotation when the other is rotated into operative coupled relation to the associated actuating means, said latter means comprising a stop bolt slidably mounted intermediate the members of each pair of selector rods, and each selector rod having a stop bolt receiving recess.

8. In mechanism of the kind described, a plurality of selector rods arranged in pairs, each rod being independently supported for both axial and rotative movements, said selector rods being adapted for connection with remote devices operable by axial movements thereof but as so connected being axially immovable except by power transmitting agencies, an actuating means slidably engaging each pair of rods, power transmitting means common to all actuating means for operating the same to transmit axial movement to said rods, each rod having a coupling element movable from inactive into active relation to the associated actuating means by rotation of the rod, each actuating means having slotted portions to ride over corresponding coupling elements when the latter occupy inactive position, a rotatable lock shaft, each actuating means having a stop-pin to abut said lock shaft, means to yieldably thrust each actuating means into stop-pin engaged relation to said lock shaft and disposed to normally engage its slotted portions with corresponding inactively positioned rod coupling elements to lock the rods against coupling rotation, said lock shaft having a plurality of release recesses relatively spaced along and around its periphery and respectively positioned for cooperation with the stop pins of the respective actuating means, whereby rotative adjustment of said lock shaft selectively disposes said release recesses to permit selective movement of said actuating means into and out of coupling element holding relation for releasing a selected pair of rods for coupling rotation while restraining the others against coupling rotation, and means to secure said lock shaft against manipulation during operation of the actuating means for transmission of operative axial movement to a coupled selector rod.

9. In mechanism of the kind described, a plurality of selector rods arranged in pairs, each rod being independently supported for both axial and rotative movements, said selector rods being adapted for connection with remote devices operable by axial movements thereof but as so connected being axially immovable except by power transmitting agencies, an actuating means slidably engaging each pair of rods, power transmitting means common to all actuating means for operating the same to transmit axial movement to said rods, each rod having a coupling element movable from inactive into active relation to the associated actuating means by rotation of the rod, each actuating means having slotted portions to ride over corresponding coupling elements when the latter occupy inactive position, a rotatable lock shaft, each actuating means having a stop-pin to abut said lock shaft, means to yieldably thrust each actuating means into stop-pin engaged relation to said lock shaft and disposed to normally engage its slotted portions with corresponding inactively positioned rod coupling elements to lock the rods against coupling rotation, said lock shaft having a plurality of release recesses relatively spaced along and around its periphery and respectively positioned for cooperation with the stop pins of the respective actuating means, whereby rotative adjustment of said lock shaft selectively disposes said release recesses to permit selective movement of said actuating means into and out of coupling element holding relation for releasing a selected pair of rods for coupling rotation while restraining the others against coupling rotation, and means to secure said lock shaft against manipulation during operation of the actuating means for transmission of operative axial movement to a coupled selector rod, said latter means comprising a spring projected bolt member, said lock-shaft having a series of circumferentially spaced and aligned bolt member receiving lock recesses corresponding in circumferential position and number to said release recesses, and means to retract said bolt member from restraining relation to said lock shaft when said actuating means and the operating means therefore are disposed in normal initial position.

10. In mechanism of the kind described, a plurality of selector rods arranged in pairs, each rod being independently supported for both axial and rotative movements, said selector rods being adapted for connection with remote devices operable by axial movements thereof but as so connected being axially immovable except by power transmitting agencies, an actuating means slidably engaging each pair of rods, power transmitting means common to all actuating means for operating the same to transmit axial movement to said rods, each rod having a coupling element movable from inactive to active relation to the associated actuating means by rotation of the rod, each actuating means having slotted portions to ride over corresponding coupling elements when the latter occupy inactive position, a rotatable lock shaft, each actuating means having a stop pin to abut the lock shaft, means to yialdably thrust each actuating means into stop pin engaged relation to said lock shaft and disposed to normally engage its slotted portions with corresponding inactively positioned rod coupling elements to lock the rods against coupling rotation, said lock shaft having a plurality of release recesses relatively spaced along and around its periphery and respectively positioned for cooperation with the stop pins of the respective actuating means, a stop bolt slidably mounted intermediate the members of each pair of selector rods, each selector rod having a stop bolt receiving recess, and means to secure said lock shaft against manipulation at certain times, comprising a spring projected bolt member, said lock shaft having a series of circumerentially spaced and aligned bolt member receiving lock recesses corresponding in circumferential position and number to said release recesses, and means to retract said bolt member when said actuating means and the operating means therefor are disposed in normal initial position.

ABRAM W. WHEATON.